(12) United States Patent
Gothoskar et al.

(10) Patent No.: US 6,980,720 B2
(45) Date of Patent: Dec. 27, 2005

(54) MODE TRANSFORMATION AND LOSS REDUCTION IN SILICON WAVEGUIDE STRUCTURES UTILIZING TAPERED TRANSITION REGIONS

(75) Inventors: Prakash Gothoskar, Allentown, PA (US); Margaret Ghiron, Allentown, PA (US); Vipulkumar Patel, Monmouth Junction, NJ (US); Robert Keith Montgomery, Easton, PA (US); Kalpendu Shastri, Orefield, PA (US); Soham Pathak, Allentown, PA (US); Katherine A. Yanushefski, Zionsville, PA (US)

(73) Assignee: SiOptical, Inc., Allentown, PA (US)

( * ) Notice: Subject to any disclaimer, the term of this patent is extended or adjusted under 35 U.S.C. 154(b) by 0 days.

(21) Appl. No.: 10/818,415

(22) Filed: Apr. 5, 2004

(65) Prior Publication Data

US 2004/0202440 A1 Oct. 14, 2004

Related U.S. Application Data

(60) Provisional application No. 60/462,050, filed on Apr. 11, 2003.

(51) Int. Cl.[7] ............... G02B 6/26; G02B 6/32
(52) U.S. Cl. ............... 385/43; 385/129; 385/33
(58) Field of Search ............... 385/39, 43, 50, 385/129–132, 33

(56) References Cited

U.S. PATENT DOCUMENTS

2002/0172464 A1 * 11/2002 Delwala .............. 385/40
2003/0068152 A1 *  4/2003 Gunn, III ............ 385/129

* cited by examiner

Primary Examiner—Sarah Song

(57) ABSTRACT

A low loss coupling arrangement between a slab/strip waveguide and a rib waveguide in an optical waveguiding structure formed on a silicon-on-insulator (SOI) platform utilizes tapered sections at the input and/or output of the rib waveguide to reduce loss. Optical reflections are reduced by using silicon tapers (either vertical tapers, horizontal tapers, or two-dimensional tapers) that gradually transition the effective index seen by an optical signal propagating along the slab/strip waveguide and subsequently into and out of the rib waveguide. Loss can be further reduced by using adiabatically contoured silicon regions at the input and output of the rib waveguide to reduce mode mismatch between the slab/strip waveguide and rib waveguide. In a preferred embodiment, concatenated tapered and adiabatic sections can be used to provide for reduced optical reflection loss and reduced optical mode mismatch.

37 Claims, 6 Drawing Sheets

US 6,980,720 B2

MODE TRANSFORMATION AND LOSS REDUCTION IN SILICON WAVEGUIDE STRUCTURES UTILIZING TAPERED TRANSITION REGIONS

CROSS REFERENCE TO RELATED APPLICATION

This application claims the benefit of Provisional Application Ser. No. 60/462,050, filed Apr. 11, 2003.

TECHNICAL FIELD

The present invention relates to the utilization of silicon optical waveguide structures on a silicon-on-insulator (SOI) platform and, more particularly, to the utilization of tapered transition regions at the input and output of the silicon waveguide to provide for mode transformation and loss reduction in the optical system.

BACKGROUND OF THE INVENTION

Rib waveguides (also known as ridge waveguides) are known and used in optical transmission arrangements such as, for example, arrangements constructed upon and using silicon-on-insulator (SOI) devices. In an SOI arrangement, a rib waveguiding structure comprises a slab/strip waveguide region within the upper silicon layer of the SOI structure, with a silicon "rib" disposed along a portion of the surface of the upper silicon layer (there may or may not be a relatively thin dielectric layer situated between the silicon surface layer and the rib). The rib itself is surrounded by a material of lower refractive index, thus forming a cladding for the waveguide. The optical mode, once coupled into this structure, is then guided within the rib and the underlying portion of the upper silicon layer.

However, such rib or ridge waveguides formed in an SOI platform are known to suffer losses due to reflection, optical mode mismatch and unwanted Fabry-Perot resonances. The reflection loss arises as a result of the abrupt change in the effective index at the input and output of the rib waveguide. The optical mode mismatch loss is associated with the lack of perfect overlap of the optical mode between the silicon surface waveguiding structure and the rib waveguide structure. Moreover, reflective steps at the substantially parallel end faces of the rib waveguide create unwanted optical resonances (i.e., Fabry-Perot cavity) modifying the intensity of light at the output of the waveguide as a function of the wavelength of the propagating optical signal. For efficient and robust input and output coupling of the optical mode in the rib, a gradual change in the effective index, as well as some sort of adiabatic mode converter, is needed.

SUMMARY OF THE INVENTION

The need remaining in the prior art is addressed by the present invention, which relates to the utilization of tapered transition regions at the input and/or output of a rib waveguide structure to provide for optical mode transformation and/or optical loss reduction at the input and/or output of the rib waveguide.

In accordance with one aspect of the present invention, a tapered silicon region is utilized at the input and/or output of a rib waveguide to provide for a gradual effective index variation, leading to a reduction in the loss due to reflection. The tapered region(s) may comprise a "vertically tapered" structure where the height of the taper changes in magnitude between the SOI surface and the top of the rib, or a "horizontally tapered" structure where the width of the taper changes in magnitude until it matches the width of the rib, or both a "vertically" and a "horizontally" tapered structure (referred to hereinafter as a "two-dimensional taper").

Mode mismatch between the silicon surface layer and the rib can be reduced in accordance with the present invention by using adiabatically-controlled tapers at the input and/or output of the waveguide so as to transform the silicon surface layer optical mode into and out of the rib waveguide mode as the signal propagates along the adiabatic regions.

Another feature of the present invention is the ability to use concatenated tapered sections to provide for both mode matching and reflection reduction using, for example, a two-dimensional reflection taper followed by an adiabatic input taper.

Advantageously, the tapered regions may comprise the same silicon material as used to form the rib structure itself, where conventional CMOS fabrication processes can then be used to form the desired structures.

These and other features and advantages of the present invention will become obvious during the course of the following discussion.

BRIEF DESCRIPTION OF THE DRAWINGS

Referring now to the drawings, where like numerals represent like parts in several views.

DETAILED DESCRIPTION

Figure 1A:
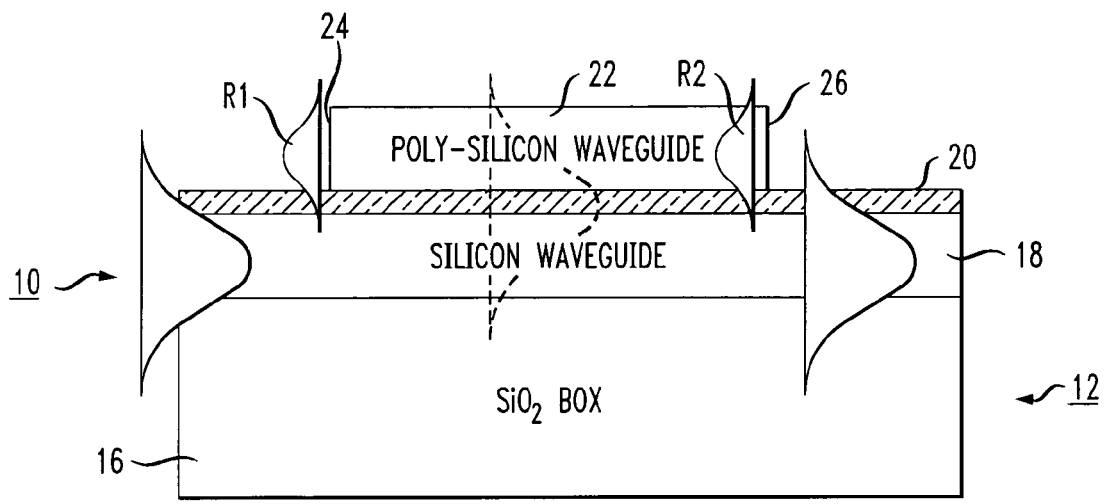
FIGS. 1(a) and (b) contain a side view and isometric view, respectively of a rib optical waveguide structure.
Figure 1B:
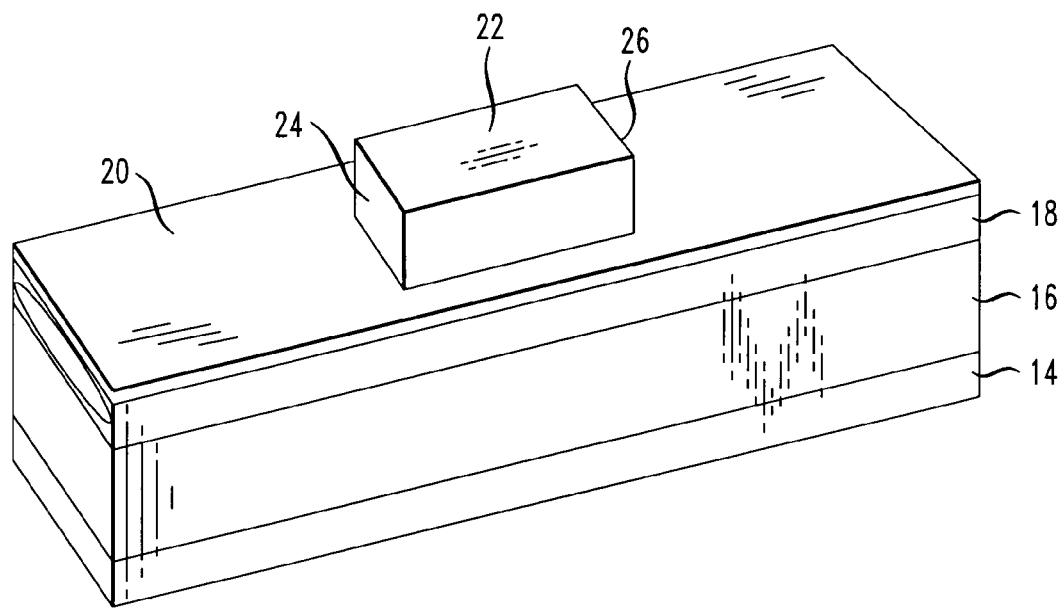

FIG. 1(a) contains a side view of an exemplary rib waveguide structure 10, this structure being described in detail in our co-pending application Ser. No. 10/146,321, filed May 15, 2002 now U.S. Pat. No. 6,898,352. For the purposes of the present invention, the configuration as shown in FIG. 1(a) particularly illustrates the presence of reflections at the input and output of the rib waveguide. An isometric view of the same rib waveguide structure 10 is illustrated in FIG. 1(b). As shown, structure 10 comprises an SOI platform 12 including a silicon substrate 14, a buried dielectric layer 16 and a relatively thin upper silicon layer 18. In this particular example, a relatively thin dielectric layer 20 is disposed across the top surface of upper silicon layer 18 and a rib waveguide structure 22 is formed along a portion of dielectric layer 20. The propagation of an exemplary optical signal is shown in FIG. 1(a), where the optical signal is first propagating within upper silicon layer 18. As the propagating signal encounters input face 24 of rib waveguide 22, a portion of the signal will be reflected, this portion designated as R1 in FIG. 1(a). The remainder of the optical signal will thereafter propagate along both upper silicon layer 18 and rib 22, next encountering output face 26 of rib waveguide 22. Another reflection will occur at output face 26, denoted as R2 in FIG. 1(a). Thereafter, the remainder of the signal will exit rib waveguide 22 and then continue to propagate along upper silicon layer 18. However, for the reasons discussed above, the output signal has suffered undesirable losses by the presence of reflection signals R1 and R2, as well as the mode mismatch between upper silicon layer 18 and rib waveguide 22. Additionally, unwanted Fabry-Perot resonances are created by the substantially parallel input and output faces 24 and 26, respectively. The optical mode present along upper silicon layer 18 and at the input of rib waveguide 22 is illustrated in particular in the isometric view of FIG. 1(b).

Figure 2A:
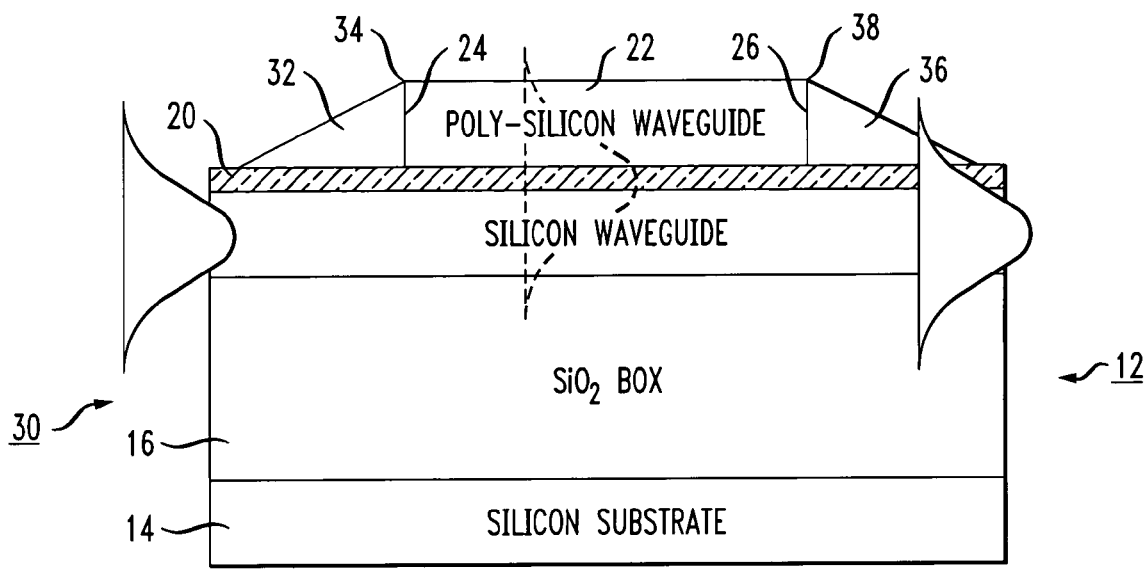
FIGS. 2(a) and (b) illustrate a side view and isometric view, respectively of an optical waveguide arrangement of the present invention, using vertical tapers at the input and output of the rib waveguide to reduce reflections.
Figure 2B:
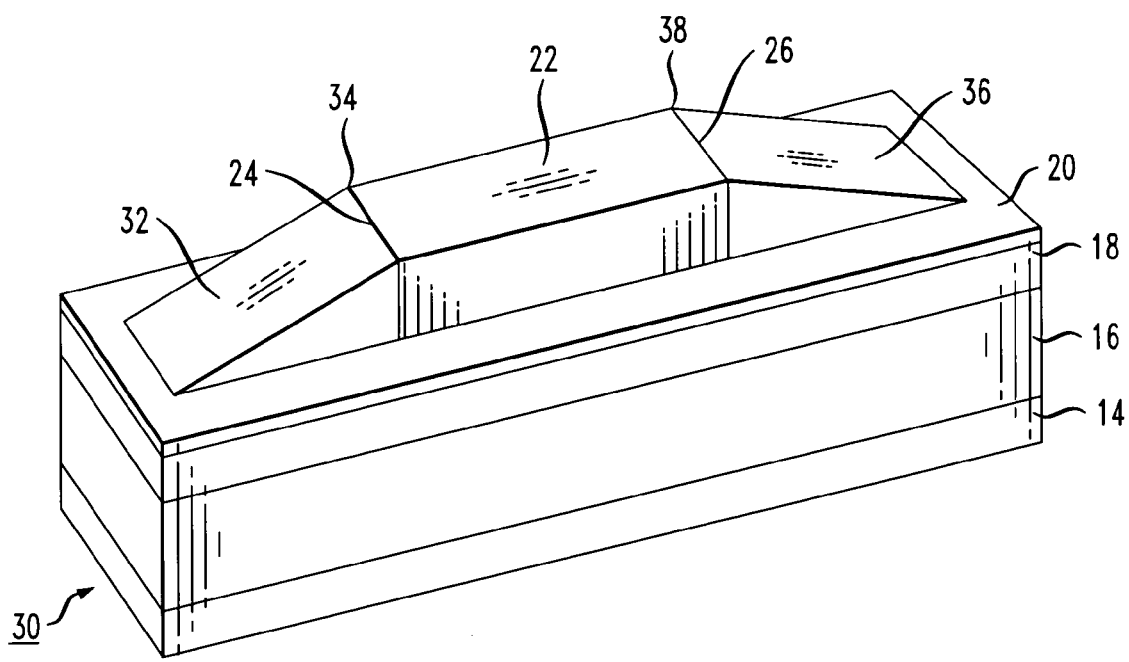

FIGS. 2(a) and 2(b) illustrate a rib waveguide structure 30, formed in accordance with the present invention, that reduces the reflections at the input and output of the rib waveguide by utilizing tapers, in this case, vertical tapers, at the input and output of the rib waveguide. As with the illustrations of FIG. 1, FIG. 2(a) contains a side view of rib waveguide structure 30 and FIG. 2(b) contains an isometric view of the same rib waveguide structure 30. For the sake of clarity, the same reference numerals will be used for the various elements of this structure that correspond to like elements in configuration 10. Referring to FIGS. 2(a) and (b), an input vertical taper 32 is disposed at the input of rib waveguide 22 such that the tallest extent 34 of input vertical taper 32 is contiguous with input face 24 of rib waveguide 22. In accordance with the present invention, therefore, input reflections (i.e., R1 of FIG. 1(a)) are reduced by providing a gradual increase in the effective index from upper silicon layer 18, through input vertical taper 32 and into rib waveguide 22. Upper silicon layer 18 is used as the input/output slab or strip optical waveguide, where the difference between a "slab" waveguide and a "strip" waveguide is only the defined width of the waveguide. In a similar fashion, an output vertical taper 36 is disposed at the output of rib waveguide 22 such that the tallest extent 38 of output vertical taper 36 is contiguous with output face 26 of rib waveguide 22. In accordance with the present invention, second taper 36 provides a gradual decrease in the effective index seen by a propagating signal so as to minimize reflection R2 at the output of rib waveguide 22. Additionally, the Fabry-Perot resonances between reflection signals R1 and R2 are reduced, since the tapered structure no longer exhibits substantially parallel end faces.

It is to be understood that rib waveguide 22, as well as input vertical taper 32 and output vertical taper 36, or any of the other taper geometries discussed below, may comprise any form of silicon that is suitable for supporting propagation of an optical signal (for example, polysilicon, amorphous silicon, strained silicon or single crystal silicon). Various types of polysilicon, such as grain size enhanced, grain boundary passivated and grain aligned silicon, may also be used. Further, and as will become evident below, both the rib waveguide and the tapers may comprise one or more layers of the same or different materials. Moreover, the edges/corners of the waveguide elements in each of the various embodiments of the present invention may be rounded to reduce optical signal loss along the waveguide, as discussed in our co-pending application Ser. No. 10/806,738, filed Mar. 23, 2004.

Figure 3:
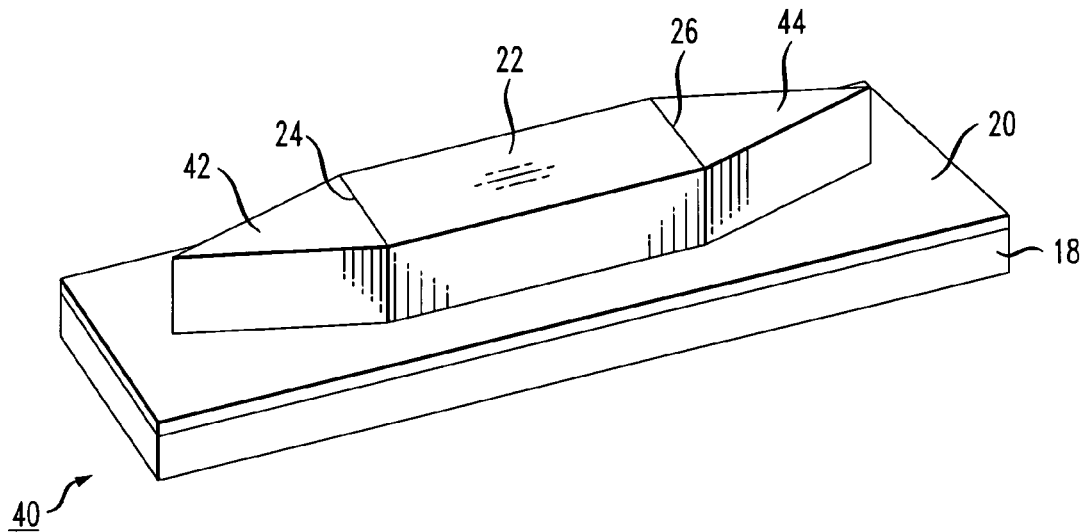
FIG. 3 illustrates an alternative embodiment of the present invention, utilizing a pair of horizontally disposed tapers at the input and output of a rib waveguide.

FIG. 3 contains an isometric view of an alternative rib waveguide structure 40 of the present invention. In this particular embodiment, an input horizontal taper 42 is disposed to be contiguous with input face 24 of rib waveguide 22 and an output horizontal taper 44 is disposed to be contiguous with output face 26 of rib waveguide 22. As with the vertical arrangement discussed above, the presence of horizontal input and output tapers 42, 44 provides for a gradient in the effective index seen by a propagating signal as it moves along upper silicon layer 18 and encounters optical waveguide 22. By gradually introducing the change in effective index, reflections at the input and output of rib waveguide 22 are substantially reduced. The Fabry-Perot resonances between R1 and R2 are also reduced by the elimination of the substantially parallel input and output end faces. An advantage of rib waveguide structure 40 as illustrated in FIG. 3 is that input and output tapers 42, 44 may easily be formed as integral components of rib waveguide 22. That is, the particular CMOS processes used to form rib waveguide 22 may include a patterned mask that defines the input and output tapers, thus forming a monolithic tapered rib waveguide structure. In a preferred embodiment of rib waveguide structure 40, relatively thin dielectric 20 will be disposed between upper silicon layer 18 and the remaining waveguiding elements (e.g., rib 22 and tapers 42, 44). Indeed, in each embodiment discussed below, it may be presumed that the preferred embodiment will include relatively thin dielectric layer, which is used for optical coupling purposes. However, the use of tapers in accordance with the present invention is not limited to these embodiments and can, indeed, be utilized in systems that do no utilize a dielectric optical coupling layer.

Figure 4:
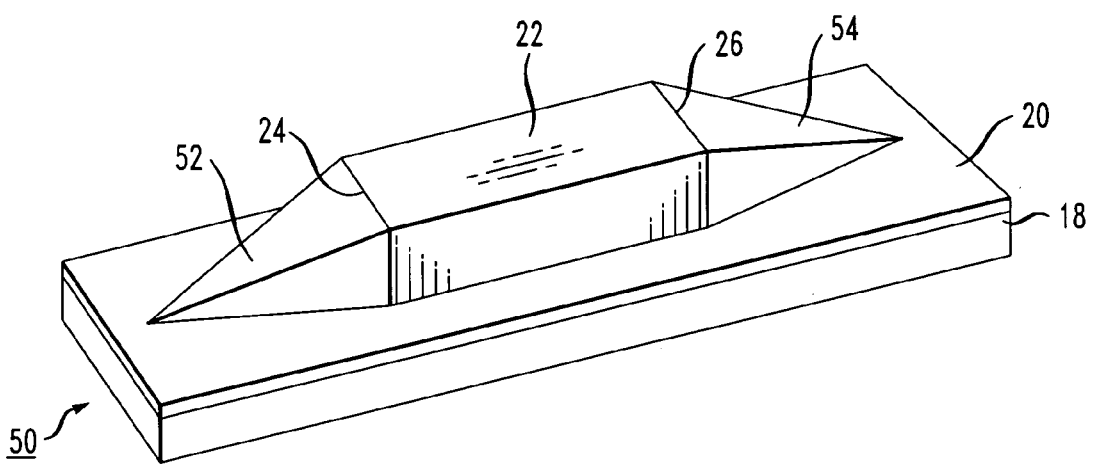
FIG. 4 illustrates yet another embodiment of the present invention, utilizing a pair of two-dimensional tapers (both vertically and horizontally tapered) at the input and output of a rib waveguide structure.

An alternative embodiment of the present invention, utilizing two-dimensional input and output tapers, is shown in an isometric view in FIG. 4. In this case, a structure 50 includes an input taper 52 and output taper 54. Referring to FIG. 4, input taper 52 is shown as increasing in both the vertical and horizontal dimensions between upper silicon layer 18 and input face 24 of rib waveguide 22. Similarly, output taper 54 is shown as decreasing in both the vertical and horizontal dimensions between output face 26 of rib waveguide 22 and upper silicon layer 18.

Although each of these embodiments is illustrated as including both an input and output taper, it is to be understood that there may be instances where only one such taper is required. That is, there may be some arrangements where a rib waveguide terminates into another type of optical device where reflections will not be a problem. In these instances, therefore, only an input taper would be required. The alternative may also be true, where a signal is coupled into a rib waveguide through another optical system and only an output taper is required. Moreover, there may be instances where a "vertical" taper is used at the input and a "horizontal" taper is used at the output. In general, the present invention is not intended to be limited to any specific combination of input and output tapers, nor is it to be limited to any particular method of fabricating the tapers or the materials used to form the rib waveguide and/or the tapers.

Figure 5:
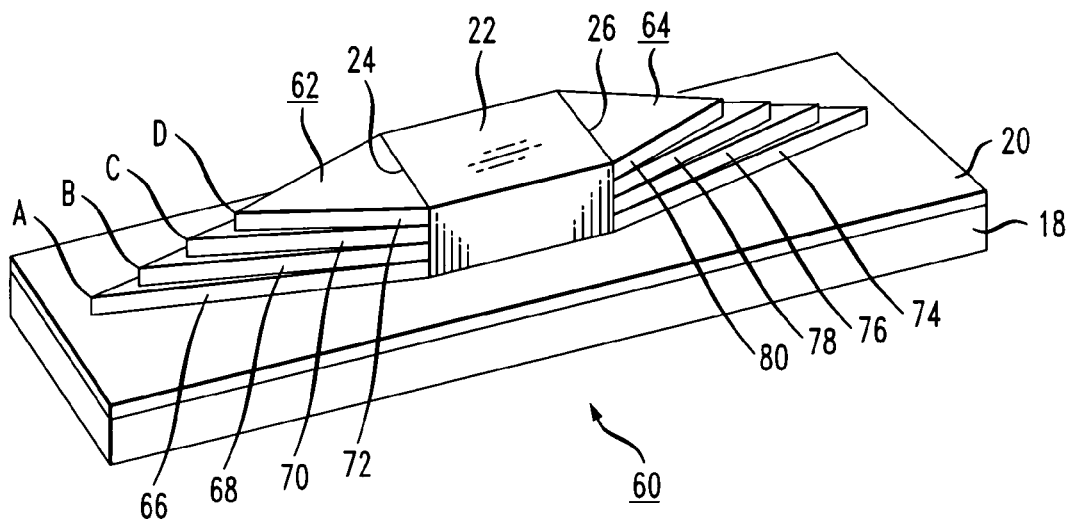
FIG. 5 contains an isometric view of one exemplary implementation of the two-dimensional tapers of FIG. 4, the implementation of FIG. 5 using a plurality of separate layers to introduce the "tapering effect" into the coupling structure.

FIG. 5 illustrates one exemplary variation/formation technique for providing a two-dimensional tapered structure similar to that illustrated in FIG. 4. In particular, FIG. 5 illustrates a rib waveguide structure 60 including an input two-dimensional taper 62 and an output two-dimensional taper 64. As shown, input two-dimensional taper 62 comprises a plurality of separate layers of, for example, silicon material, where the dimensions of each layer are controlled to provide for the desired tapering effect. In an exemplary fabrication process, a first layer 66 is formed on dielectric layer 20 (or, alternatively, directly on upper silicon layer 18 if a dielectric layer is not used). The tapering of first layer 66 is controlled to define an input point A and thereafter taper outward to be contiguous with input face 24 of rib waveguide 22. A second layer 68 is then formed over first layer 66, with an input point B defined as offset from first input point A (to form the vertical taper), and thereafter tapering outward to meet input face 24 of rib waveguide 22. A third layer 70 is similarly formed over second layer 68, with its input point C positioned to continue the desired vertical taper. A fourth layer 72 is shown as completing the two-dimensional structure of input taper 62.

In general, any desired number of layers may be used to form this two-dimensional structure, where it is to be understood that a larger number of layers will function to decrease the reflection at the input. However, a larger number of layers will require additional patterning and depositing steps in the fabrication process. Thus, a trade-off exists between the amount of reflection desired to be minimized and the processing time and expense that may be expended to achieve this result. Moreover, the potential exists to use different materials, if desired, for each layer within the taper, or to include a relatively thin oxide (for example, a native oxide) between contiguous layers of the taper structure. Advantageously, the plurality of separate layers 74, 76, 78 and 80 used to form two-dimensional output taper 64 may be formed during the same patterning and deposit steps used to form input two-dimensional taper 62.

Figure 6:
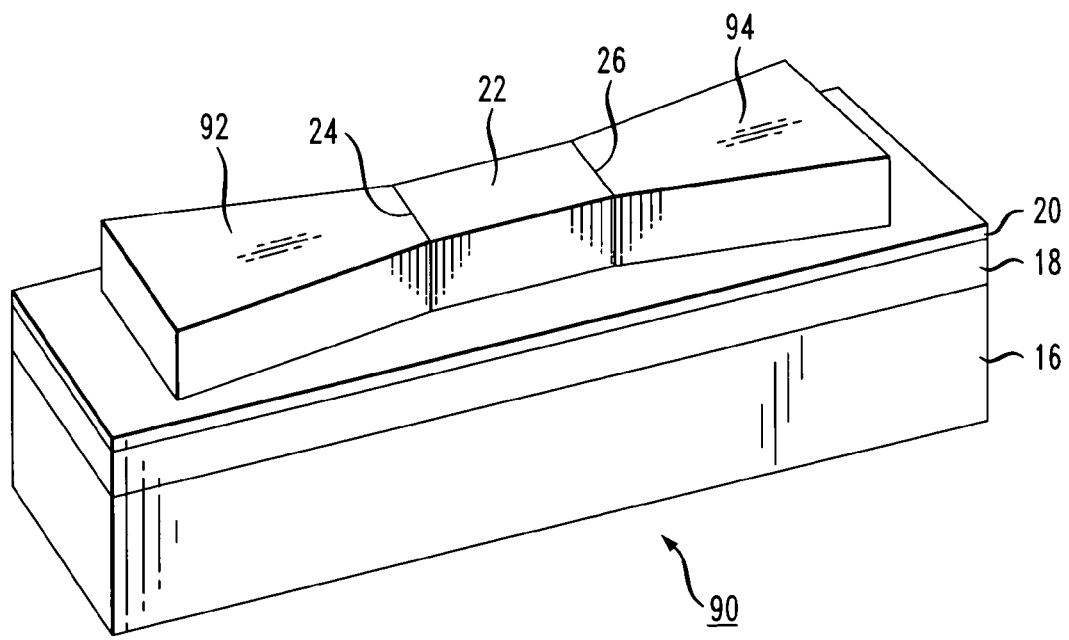
FIG. 6 is an isometric view of another embodiment of the present invention, utilizing input and output adiabatic couplers to reduce mode mismatch at the input and output of the rib waveguide structure.
Figure 7:
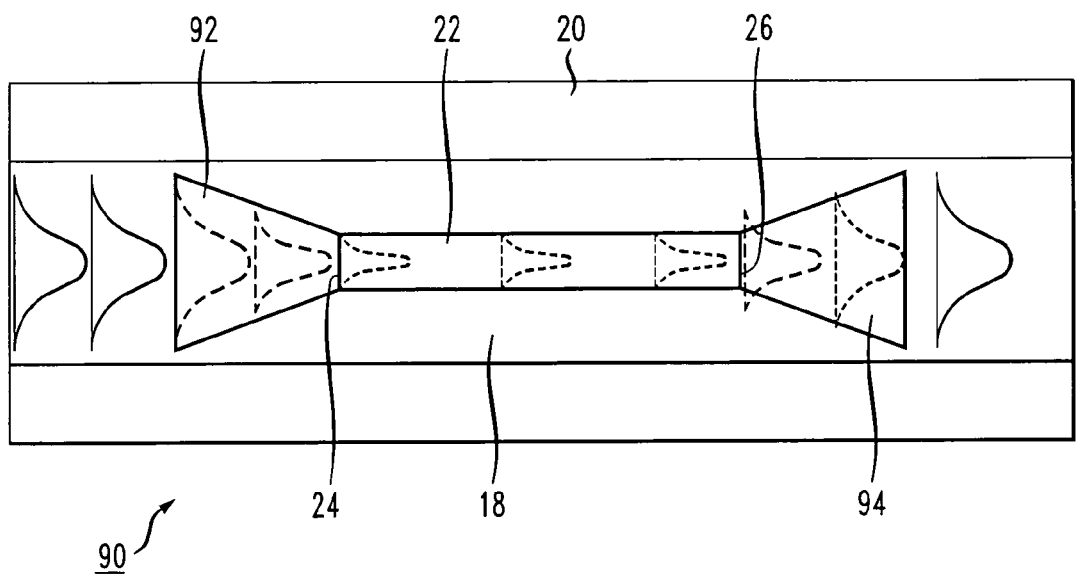
FIG. 7 is a top view of the arrangement of FIG. 6, illustrate the mode matching capability associated with the adiabatic couplers.

While the various taper geometries discussed above are all successful in minimizing the presence of reflections at the input and output of a rib waveguide, the problem of mode mismatch remains. The arrangement of the present invention, as illustrated in FIG. 6, addresses the mode problem by using an adiabatic input taper 92 and adiabatic output taper 94 in association with rib waveguide structure 90. In particular, the use of input adiabatic taper 92 allows for the optical mode to be controlled so as to gradually decrease from the larger mode size present along upper silicon layer 18 to the smaller mode size at input face 24 of rib waveguide 22. A similar mode transition will occur, therefore, at output face 26, allowing for the mode size to gradually increase and match the mode of upper silicon layer 18 beyond the output of rib waveguide 22. FIG. 7 contains a top view of rib waveguide structure 90, illustrating in particular the change in optical mode along the optical signal path. As shown, the optical mode presented at input face 96 of input adiabatic taper 92 will gradually decrease along taper 92 until reaching input face 24 of rib waveguide 22. Well-known optics formulas can be used to define the particular dimensions of input adiabatic taper 92 required to optimize the mode matching between silicon surface layer 18 and rib waveguide 22. Similar mode matching occurs at output face 26 of rib waveguide 22, where output adiabatic taper 94 will gradually increase the optical mode of the optical signal until the mode matches that of upper silicon layer 18.

Figure 8:
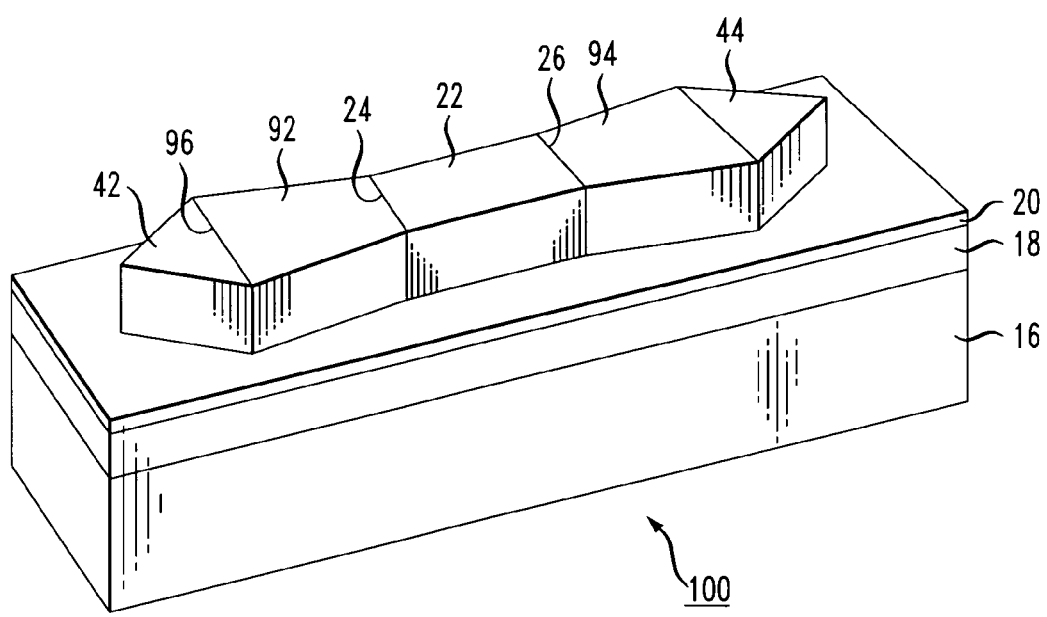
FIG. 8 is an isometric view of another embodiment of the present invention, utilizing both a tapered coupler and an adiabatic coupler, disposed in series to provide both reflection reduction and mode matching in accordance with the present invention.
Figure 9:
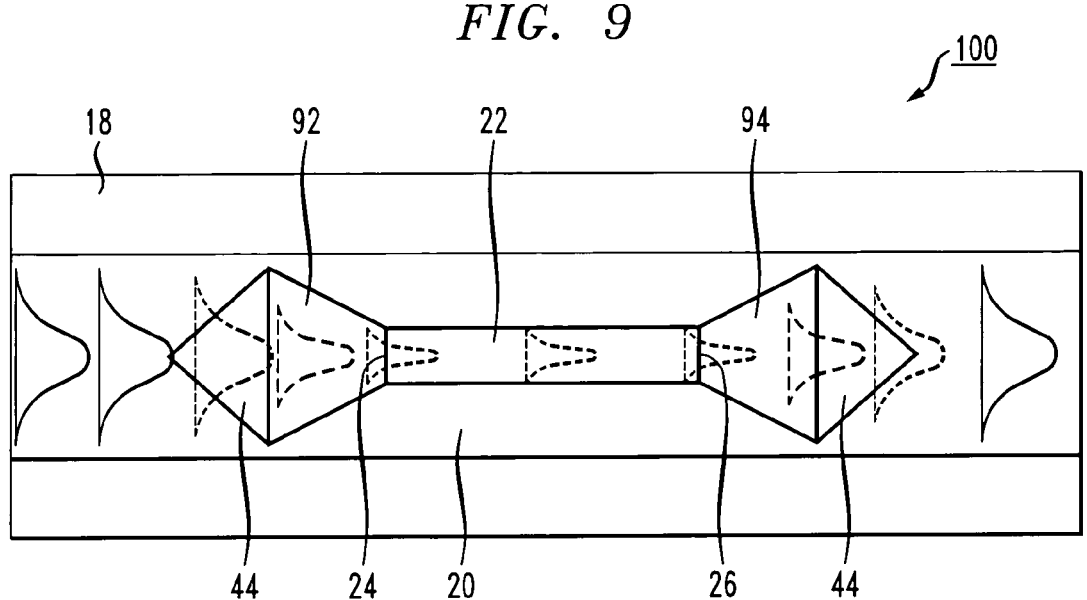
FIG. 9 is a top view of the arrangement of FIG. 8, illustrating the optical properties of this inventive embodiment.

A preferred embodiment of the present invention that combines the advantages of mode matching and reflection reduction is illustrated in FIG. 8, which contains an isometric view of rib waveguide structure 100. FIG. 9 contains a top view of rib waveguide structure 100. As shown, structure 100 includes input and output horizontal tapers 42 and 44, used to reduce reflections, and input and output adiabatic tapers 92 and 94, used to provide optical mode matching. In particular, a propagating optical signal is first introduced into input horizontal taper 42, which allows for the effective index seen by the propagating optical signal to gradually increase, thus reducing reflections. The signal exiting input horizontal taper 42 is thereafter coupled into input face 96 of input adiabatic taper 92, where adiabatic taper 92 will gradually decrease the optical mode size so as to match the mode size at input face 24 of rib waveguide structure 22. Since there is no abrupt change in effective index along adiabatic taper 92, no additional reflections will be created, provided that tapers 42 and 92 are formed from materials with substantially similar refractive indices. Similarly, the optical signal exiting at output face 26 of rib waveguide 22 will first propagate through adiabatic output taper 94 so as to provide optical mode matching from the rib structure to the silicon surface layer. The propagating optical signal then passes through output horizontal taper 44, where output taper 44 will gradually reduce the effective index seen by the optical signal and therefore reduce output reflections.

Figure 10:
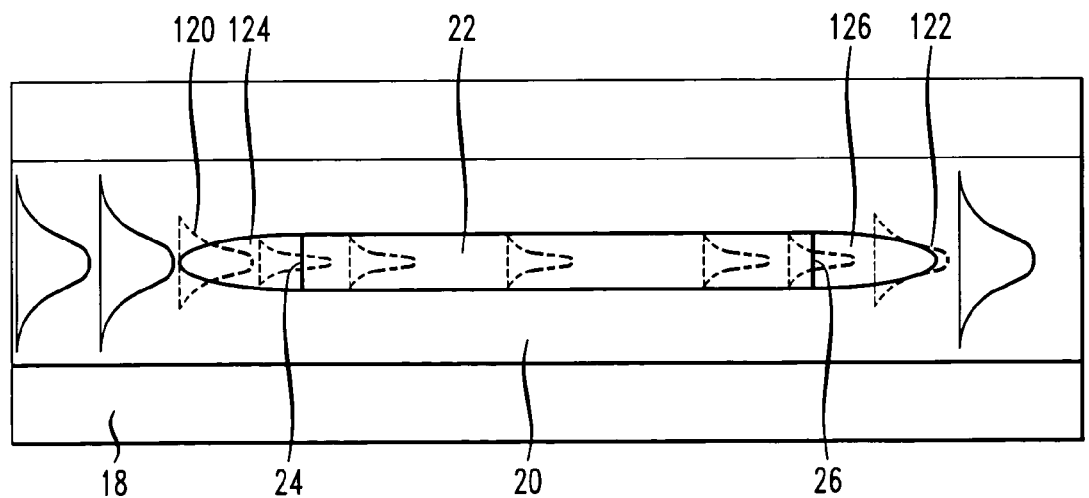
FIG. 10 is a top view of yet another embodiment of the present invention, utilizing a lensed feature formed as an integral part of the endface of a tapered coupling section.

As discussed above, a significant advantage of the present invention is the ability to use conventional CMOS processing techniques to form the various desired structures. Indeed, other optically desired features may be formed as integral components with the tapers and rib waveguide. For example, the tapers may be formed to include coupling lenses to maximize the coupling efficiency between upper silicon layer 18 and rib waveguide 22. FIG. 10 contains a top view of an exemplary arrangement of the present invention, with focusing lenses 120 and 122 formed in association with a pair of input and output tapers 124, 126.

What is claimed is:

1. An optical waveguiding structure comprising
   a slab/strip single crystal silicon waveguide including a top major surface;
   a silicon rib waveguide disposed over a portion of the top major surface of the slab-strip single crystal silicon waveguide, the silicon rib waveguide defined as comprising an input face and an output face such that an optical signal propagating along the silicon slab/strip waveguide will be coupled through the silicon rib input face to thereafter propagate along both the slab/strip and the rib, and subsequently exit the silicon rib waveguide along the output face and then propagate along the slab/strip silicon waveguide; and
   at least one silicon lensed taper disposed along a portion of the slab-strip waveguide top major surface so as to be contiguous with at least one of the silicon rib waveguide input face and output face, the silicon lensed taper used to improve optical coupling between the silicon slab/strip waveguide and the silicon rib waveguide.

2. An optical waveguiding structure as defined in claim 1 wherein the at least one silicon lensed taper comprises a pair of lensed tapers, a first lensed taper disposed contiguous with the input face of the silicon rib waveguide and a second leased taper disposed contiguous with the output face of the silicon rib waveguide.

3. An optical waveguiding structure as defined in claim 1 wherein the structure further comprises a relatively thin dielectric layer disposed between the slab/strip silicon waveguide and the silicon rib waveguide.

4. An optical waveguiding structure as defined in claim 1 wherein the at least one silicon leased taper comprises a vertically disposed lensed taper.

5. An optical waveguiding structure as defined in claim 4 wherein the vertically disposed lensed taper comprises a single lensed taper disposed contiguous with the silicon rib waveguide input face, said vertically disposed lensed taper increasing in height from the top major surface of the slab/strip silicon waveguide so as to be essentially the same height as the silicon rib waveguide at said input face.

6. An optical waveguiding structure as defined in claim 4 wherein the vertically disposed lensed taper comprises a single lensed taper disposed contiguous with the silicon rib waveguide output face, said vertically disposed lensed taper decreasing in height from the silicon rib waveguide output face to the top major surface of the slab/strip silicon waveguide.

7. An optical waveguiding structure as defined in claim 4 wherein the vertically disposed lensed taper comprises a pair of lensed tapers, an input lensed taper disposed contiguous with the silicon rib waveguide input face, said input lensed taper increasing in height from the top major surface of the slab/strip silicon waveguide so as to be essentially the same height as the silicon rib waveguide at said input face, and an output lensed taper disposed contiguous with the silicon rib waveguide output face, said vertically disposed tensed taper decreasing in height from the silicon rib waveguide output face to the top major surface of the slab/strip silicon waveguide.

8. An optical waveguiding structure as defined in claim 4 wherein the structure further comprises a relatively thin dielectric layer disposed between the slab/strip waveguide and the silicon rib waveguide.

9. An optical waveguiding structure as defined in claim 1 wherein the at least one silicon lensed taper comprises a horizontally disposed lensed taper.

10. An optical waveguiding structure as defined in claim 9 wherein the horizontally disposed lensed taper comprises a single lensed taper disposed contiguous with the silicon rib waveguide input face, said horizontally disposed lensed taper increasing in width along the top major surface of the slab/strip silicon waveguide so as to be essentially the same width as the input face of the silicon rib waveguide.

11. An optical waveguiding structure as defined in claim 9 wherein the horizontally disposed lensed taper comprises a single lensed taper disposed contiguous with the silicon rib waveguide output face, said horizontally disposed lensed taper decreasing in width along the top major surface of the slab/strip waveguide from a width essentially the same as the width of the output face of the silicon rib waveguide until coming to a rounding termination.

12. An optical waveguiding structure as defined in claim 9 wherein the horizontally disposed lensed taper comprises a pair of lensed tapers, an input tensed taper disposed contiguous with the silicon rib waveguide input face, said input taper increasing in width along the top major surface of the slab/strip silicon waveguide so as to be essentially the same width as the input face of the silicon rib waveguide, and an output lensed taper disposed contiguous with the silicon rib waveguide output face, said output lensed taper decreasing in width along the top major surface of the slab/strip silicon waveguide from a width essentially the same as the width of the output face of the silicon rib waveguide until coming to a rounded termination.

13. An optical waveguiding structure as defined in claim 9 wherein the structure further comprises a relatively thin dielectric layer disposed between the slab/strip waveguide and the silicon rib waveguide.

14. An optical waveguiding structure as defined in claim 1 wherein the at least one silicon leased taper comprises a two-dimensional structure, tapered in both the horizontal and vertical directions.

15. An optical waveguiding structure as defined in claim 14, wherein the at least one silicon lensed taper comprises an input two-dimensional lensed taper, disposed contiguous with the input face of the silicon rib waveguide and configured to increase in height and width from the top major surface of the slab/strip silicon waveguide so as to be essentially the same height and width as the silicon rib waveguide at said input face.

16. An optical waveguiding structure as defined in claim 14, wherein the at least one silicon tensed taper comprises an output two-dimensional lensed taper, disposed contiguous with the output face of the silicon rib waveguide and configured to decrease in height and width from the output face of the silicon rib waveguide along the top major surface of the silicon slab/strip waveguide until coming to a rounded termination.

17. An optical waveguiding structure as defined in claim 14, wherein the at least one silicon tensed taper comprises a pair of lensed tapers, an input two-dimensional lensed taper, disposed contiguous with the input face of the silicon rib waveguide and configured to increase in height and width from the top major surface of the slab/strip silicon waveguide so as to be essentially the same height and width as the silicon rib waveguide at said input face, and an output two-dimensional lensed taper, disposed contiguous with the output face of the silicon rib waveguide and configured to decrease in height and width from the output face of the silicon rib waveguide along the top major surface of the silicon slab/strip waveguide until coming to a rounded termination.

18. An optical waveguiding structure as defined in claim 14 wherein the structure further comprises a relatively thin dielectric layer disposed between the slab/strip waveguide and the silicon rib waveguide.

19. An optical waveguiding structure as defined in claim 1 wherein the at least one silicon lensed taper comprises an adiabatically contoured mode matching lensed taper.

20. An optical waveguiding structure as defined in claim 19 wherein the at least one adiabatically contoured mode matching lensed taper comprises an adiabatic input lensed taper disposed contiguous with the input face of the silicon rib waveguide, said adiabatic input lensed taper providing optical mode matching between the silicon slab/strip waveguide and said silicon rib waveguide.

21. An optical waveguiding structure as defined in claim 19 wherein the at least one adiabatically contoured mode matching lensed taper comprises an adiabatic output lensed taper disposed contiguous with the output face of the silicon rib waveguide, said adiabatic output lensed taper providing optical mode matching between the silicon rib waveguide and the silicon slab/strip waveguide.

22. An optical waveguiding structure as defined in claim 19 wherein the at least one adiabatically contoured mode matching lensed taper comprises a pair of lensed tapers, an input lensed taper disposed contiguous with the input face of the silicon rib waveguide, said adiabatic input lensed taper providing optical mode matching between the silicon slab/ strip waveguide and said silicon rib waveguide, and an output lensed taper disposed contiguous with the output face of the silicon rib waveguide, said adiabatic output lensed taper providing optical mode matching between the silicon rib waveguide and the silicon slab/strip waveguide.

23. An optical waveguiding structure as defined in claim 19 wherein the structure further comprises a relatively thin dielectric layer disposed between the slab/strip waveguide and the silicon rib waveguide.

24. An optical waveguiding structure as defined in claim 1 wherein the at least one silicon lensed taper comprises a form of silicon selected from the group consisting of: polysilicon, amorphous silicon, strained silicon, substantially single crystal silicon, and single crystal silicon.

25. An optical waveguiding structure as defined in claim 24 wherein the polysilicon is selected from a group consisting of: grain-size-enhanced, grain-boundary-passivated, and grain-aligned polysilicon.

26. An optical waveguiding structure as defined in claim 1 wherein the silicon rib waveguide and the at least one silicon lensed taper comprise the same form of silicon.

27. An optical waveguiding structure as defined in claim 26 wherein the at least one silicon lensed taper is formed as integral with the silicon rib waveguide.

28. An optical waveguiding structure as defined in claim 1 wherein the at least one silicon lensed taper comprises a single layer of silicon material.

29. An optical waveguiding structure as defined in claim 1 wherein the at least one silicon lensed taper comprises a plurality of layers of one or more silicon materials.

30. An optical waveguiding structure providing both optical mode matching and optical reflection reduction, said structure comprising
a slab/strip single crystal silicon waveguide including a top major surface;
a silicon rib waveguide disposed over a portion of the top major surface of the slab/strip single crystal silicon waveguide, the silicon rib waveguide defined as comprising an input face and an output face such that an optical signal propagating along the silicon slab/strip waveguide will be coupled through the silicon rib input face to thereafter propagate along both the slab/strip and the rib, and subsequently exit the silicon rib waveguide along the output face and then propagate along the slab/strip silicon waveguide;
an adiabatically-contoured silicon region disposed along the slab/strip waveguide top major surface so as to be contiguous with either one of the silicon rib waveguide input face and output face, the adiabatically-contoured silicon region used to provide optical mode matching between the silicon slab/strip waveguide and the silicon rib waveguide; and
a silicon lensed taper disposed along the slab/strip waveguide top major surface so as to be contiguous with an exposed endface of the adiabatically-contoured silicon region, the silicon taper providing a change in effective index between the silicon slab/strip waveguide and the silicon rib waveguide so as to reduce optical reflections at either one of the silicon rib waveguide input and output faces.

31. The optical waveguiding structure as defined in claim 30 wherein the adiabatically-contoured silicon region and the silicon lensed taper are disposed at the input face of the silicon rib waveguide.

32. The optical waveguiding structure as defined in claim 30 wherein the adiabatically-contoured silicon region and the silicon lensed taper are disposed at the output face of the silicon rib waveguide.

33. The optical waveguiding structure as defined in claim 30 wherein the adiabatically-contoured silicon region and the silicon lensed taper are disposed at the input face of the silicon rib waveguide, and a second adiabatically-contoured silicon region and second silicon lensed taper are disposed at the output face of the silicon rib waveguide.

34. The optical waveguiding structure as defined in claim 30 wherein the silicon lensed taper comprises a horizontally disposed lensed taper.

35. The optical waveguiding structure as defined in claim 30 wherein the silicon lensed taper comprises a vertically disposed lensed taper.

36. The optical waveguiding structured as defined in claim 30 wherein the silicon lensed taper comprises a two-dimensional lensed taper, tapering in both the horizontal and vertical directions.

37. The optical waveguiding structure as defined in claim 30 wherein the structure further comprises a relatively thin dielectric layer disposed between the slab/strip waveguide and the silicon rib waveguide.

* * * * *